US011032430B2

(12) United States Patent
Bleggi et al.

(10) Patent No.: US 11,032,430 B2
(45) Date of Patent: *Jun. 8, 2021

(54) TRANSMISSION DETECTION, INTERRUPTION, AND NOTIFICATION SYSTEM

(71) Applicant: Roybuck Enterprises LLC, Lowellville, OH (US)

(72) Inventors: Albert M. Bleggi, Naples, FL (US); Wolfgang H. Neumann, Naples, FL (US); Roy Palumbo, Jr., Lowellville, OH (US)

(73) Assignee: Roybuck Enterprises LLC, Lowellville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,807

(22) Filed: Dec. 4, 2018

(65) Prior Publication Data

US 2019/0104217 A1  Apr. 4, 2019

Related U.S. Application Data

(63) Continuation of application No. 14/827,234, filed on Aug. 14, 2015, now Pat. No. 10,178,235.

(60) Provisional application No. 62/037,265, filed on Aug. 14, 2014.

(51) Int. Cl.
*H04M 11/04* (2006.01)
*H04M 1/72463* (2021.01)
*H04M 1/72436* (2021.01)
*H04M 1/72454* (2021.01)

(52) U.S. Cl.
CPC ....... *H04M 11/04* (2013.01); *H04M 1/72463* (2021.01); *H04M 1/72436* (2021.01); *H04M 1/72454* (2021.01)

(58) Field of Classification Search
CPC ............. H04M 11/04; H04M 1/72552; H04M 1/72569; H04M 1/72577
See application file for complete search history.

(56) References Cited

U.S. PATENT DOCUMENTS

| 7,646,312 | B2 | 1/2010 | Rosen |
| 7,711,355 | B1 | 5/2010 | Kruger et al. |
| 8,131,205 | B2 | 3/2012 | Rosen |
| 8,154,393 | B2 | 4/2012 | Breiner |
| 8,384,555 | B2 | 2/2013 | Rosen |
| 8,457,692 | B2 | 6/2013 | Fyke et al. |
| 8,461,973 | B2 | 6/2013 | Reed et al. |
| 8,543,053 | B1 | 9/2013 | Melamed et al. |
| 8,577,352 | B1 | 11/2013 | Breiner |
| 2003/0045265 | A1 | 3/2003 | Huang et al. |
| 2003/0137408 | A1 | 7/2003 | Breiner |
| 2005/0255874 | A1 | 11/2005 | Stewart-Baxter et al. |

(Continued)

FOREIGN PATENT DOCUMENTS

WO   WO-01/73956 A2   10/2001

OTHER PUBLICATIONS

International Search Report and Written Opinion for related International Application No. PCT/US15/45420, dated Nov. 12, 2015, 10 pages.

*Primary Examiner* — Timothy X Pham
(74) *Attorney, Agent, or Firm* — Calfee, Halter & Griswold LLP

(57) ABSTRACT

Systems and methods for transmission detection, interruption, and notification are described.

20 Claims, 5 Drawing Sheets

(56) References Cited

U.S. PATENT DOCUMENTS

| | | | |
|---|---|---|---|
| 2009/0004968 A1* | 1/2009 | Miyake | H04B 15/02 |
| | | | 455/26.1 |
| 2011/0065375 A1 | 3/2011 | Bradley | |
| 2011/0080274 A1 | 4/2011 | Reed et al. | |
| 2011/0183601 A1 | 7/2011 | Hannon | |
| 2011/0256899 A1 | 10/2011 | Khazei | |
| 2012/0040665 A1 | 2/2012 | Liu et al. | |
| 2012/0149341 A1* | 6/2012 | Tadayon | H04B 5/0062 |
| | | | 455/412.1 |
| 2012/0214472 A1* | 8/2012 | Tadayon | H04B 5/0062 |
| | | | 455/418 |
| 2012/0252350 A1 | 10/2012 | Steinmetz et al. | |
| 2013/0138267 A1 | 5/2013 | Hignite et al. | |
| 2013/0150004 A1 | 6/2013 | Rosen | |
| 2013/0178234 A1 | 7/2013 | Jones et al. | |
| 2013/0225092 A1 | 8/2013 | Chalmers et al. | |
| 2013/0344859 A1* | 12/2013 | Abramson | H04M 1/72577 |
| | | | 455/418 |
| 2014/0179351 A1 | 6/2014 | Hannon | |
| 2016/0050310 A1 | 2/2016 | Bleggi et al. | |
| 2016/0198310 A1 | 7/2016 | Chalmers et al. | |
| 2017/0013592 A1 | 1/2017 | Nakano | |

\* cited by examiner

TRANSMISSION DETECTION, INTERRUPTION, AND NOTIFICATION SYSTEM

CROSS-REFERENCE TO RELATED APPLICATIONS

This application is a continuation of U.S. application Ser. No. 14/827,234, filed Aug. 14, 2015, which claims priority to U.S. Provisional Patent Application No. 62/037,265, filed Aug. 14, 2014; the contents of which are incorporated by reference herein in their entirety.

FIELD OF THE INVENTION

The present invention relates to systems and methods for analyzing and modifying transmissions, and, more specifically, to systems and methods for transmission detection, interruption, and notification.

BACKGROUND OF THE INVENTION

As use of cellular phones and other informational electronic devices has increased, so has the propensity of motor vehicle drivers to use such devices while operating motor vehicles. The use of electronic devices to make telephone calls, send text messages, use the Internet, and other activities has been determined to significantly distract driver attention from driving related tasks, increasing the risk of vehicle related accidents due to driver inattention. This is a significant safety hazard both for the driver of the motor vehicle and others on the road.

Needs exist for improved systems and methods for transmission detection, interruption, and notification.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
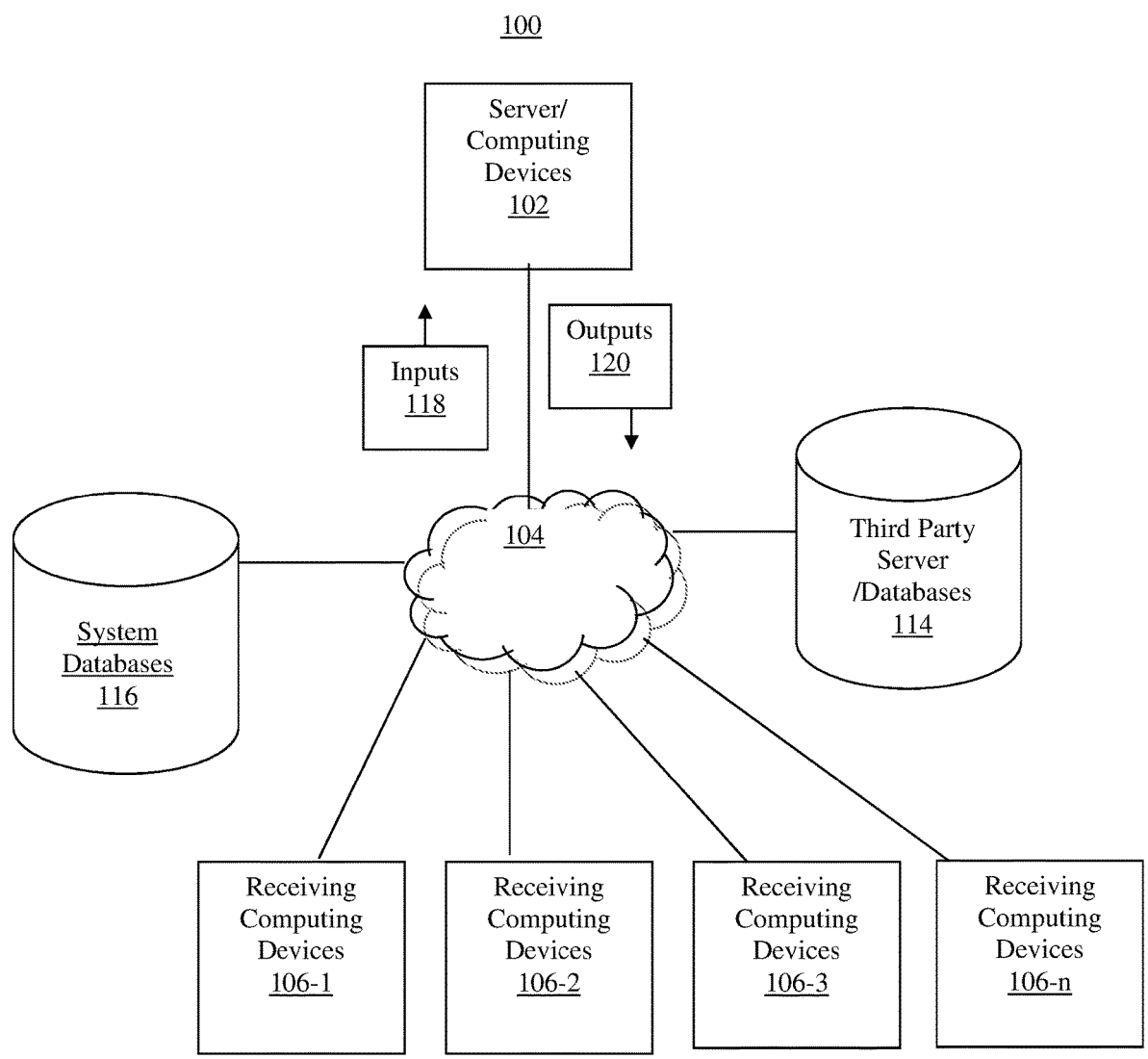
FIG. 1 shows an exemplary system for transmission detection, interruption, and notification.

Systems and methods are described for using various tools and procedures for transmission detection, interruption, and notification. In certain embodiments, the tools and procedures may be used in conjunction with transmission detection, interruption, and notification. The examples described herein relate to transmission detection, interruption, and notification for illustrative purposes only. The systems and methods described herein may be used for many different industries and purposes, including automotive, aeronautic, law enforcement, security, and/or other industries completely. In particular, the systems and methods may be used for any industry or purpose where transmission detection, interruption, and notification is needed. For multi-step processes or methods, steps may be performed by one or more different parties, servers, processors, etc.

In certain embodiments, a transmission detection system may determine the presence of one or more transmissions and may analyze the one or more transmissions. In certain embodiments, the one or more transmissions may be one or more cellular transmissions. Cellular transmissions may include communications from one, multiple, or all cellular service providers. Cellular transmissions may include mobile radio frequency (RF) service providers. For purposes of this disclosure, the terms "cellular" and "mobile" may be used interchangeably. In certain embodiments, the one or more transmissions may be detected. The detection may be via frequency detection and/or magnetic field emanation. In certain embodiments, the detection may be detection of cellular RF technology frequency. In certain embodiments, the detection may be RF electromagnetic radiation emanation, such as magnetic fields. Emanating radiation may be specific absorption rate (SAR). SAR is a measure of the rate at which energy is absorbed by the human body when exposed to a RF electromagnetic field. In certain embodiments, the detection may be both detection of cellular RF technology frequency and RF electromagnetic radiation emission. Cellular devices may emit RF frequencies and/or electromagnetic radiation. For purposes of this disclosure, cellular devices may be any device that is capable of receiving and/or emitting cellular frequencies. Cellular devices may be, but are not limited to, cellular telephones, smart phones, tablet computers, laptop computers, wearable devices, personal digital assistants, etc. The emitted RF frequencies and/or electromagnetic radiation may allow for determination of distance from an antenna to the cellular devices. The one or more transmissions may be analyzed to determine a categorization of the one or more transmissions. For example, the analysis may determine that the one or more transmissions is a text message (SMS, MMS), email, voice communication, etc. In certain embodiments, the transmission detection system may analyze cellular transmissions and distinguish text message transmissions from other types of cellular transmissions. The one or more transmissions may be analyzed to determine one or more patterns of interference in the cellular frequencies emitted by the cellular device and/or interference in the electromagnetic radiation emitted from a cellular device. For example, if a user of a cellular device is texting, RF frequency and magnetic radiation may briefly cause an interference and/or a series of interferences. This interference may be detected and used to identify the type of transmission. Certain embodiments may correlate with patterns for known, specified types of cellular transmissions. Certain embodiments may include thresholds and/or ranges of values for patterns of interruptions for various types and/or categories of cellular transmissions. Certain embodiments may compare an interference or pattern of interferences with patterns and/or thresholds of known cellular transmissions. A categorization based on this analysis may be completed. If a pattern matches a set of unauthorized cellular transmissions, then the cellular transmission may be interrupted. Certain patterns of interference may correlate with specific categories of transmissions.

Figure 5:
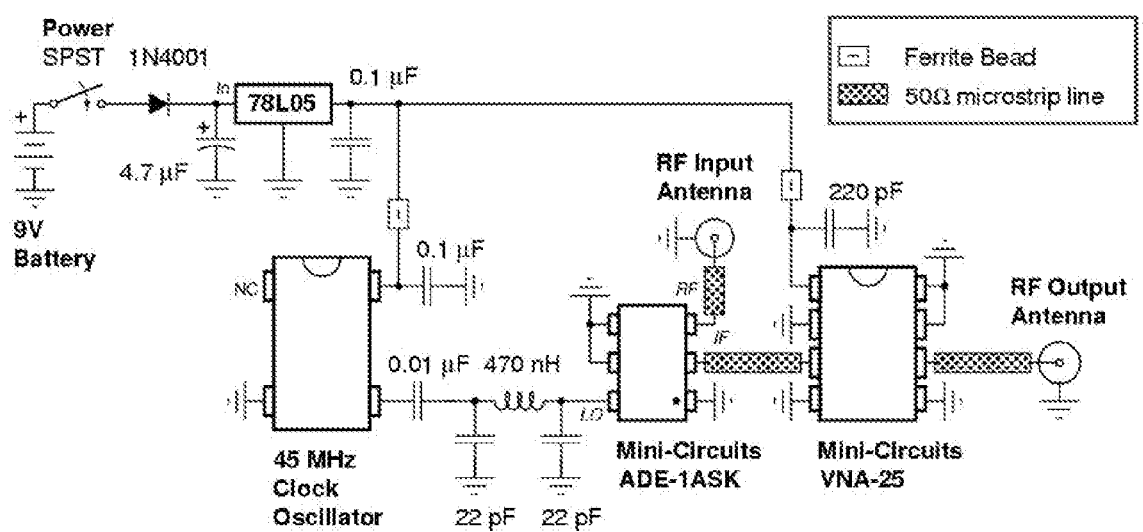
FIG. 5 is a schematic diagram of an exemplary interrupting device.

In certain embodiments, an interruption system may disrupt the one or more transmissions. In certain embodiments, only unwanted transmissions may be interrupted. In certain embodiments, the interruption may be a localized disruption. Systems and methods for interrupting cellular device transmissions are known in the art. FIG. 5 illustrates an exemplary radio frequency detection/blocking device. Exemplary devices may include, but are not limited to, devices from EDOACUSTICA, TEKTRONIX TEK, ALLJAMMER, and ANALOG.

In certain embodiments, a notification system may alert one or more third parties of an event. An event may be an occurrence in a first vehicle. The event may be an unauthorized, unapproved, and/or illegal activity. In certain embodiments, the event may be an activity that is prohibited by law. In certain embodiments, the event may be an activity that is dangerous to the driver of the first vehicle or one or more drivers of other vehicles. In certain embodiments, the event is using a cellular device for an activity other than voice communications. In certain embodiments, the event is using a cellular device for an activity other than voice communications using a hands-free system. In certain embodiments, the event is using a cellular device for an activity other than voice communications using a Bluetooth system. In certain embodiments, the event is using a cellular device for emailing, text messaging, using the Internet, playing games, etc. In certain embodiments, the event is using a cellular device for text messaging or emailing. In certain embodiments, the event is using a cellular device for text messaging. In certain embodiments, the notification system may alert drivers of other vehicles that the driver of an event in the first vehicle. The drivers of other vehicles may be alerted by one or more exterior vehicle signals. In certain embodiments, the one or more exterior vehicle signals may be one or more external lights. In certain embodiments, the one or more exterior vehicle signals may be on the first vehicle. In certain embodiments, the system in the first vehicle may transmit a notification to a third party. In certain embodiments, the third party may be a law enforcement agency. The law enforcement agency may be a central law enforcement center, such as a server, dispatcher, headquarters, etc. The law enforcement agency may be one or more individual law enforcement units, such as an officer, emergency vehicle, unit, etc. The notification system may also alert one or more law enforcement agencies of the event. For example, law enforcement may be notified that a driver of the first vehicle is engaging in one or more unwanted transmissions while driving, such as texting while driving. The third party may be one or more law enforcement agencies in proximity to the first vehicle. The third party may be one or more drivers of other vehicles, such as vehicles in proximity to the first vehicle. In certain embodiments, proximity may be five miles or less, two miles or less, one mile or less, half a mile or less, a quarter mile or less, a tenth of a mile or less, within visual range, etc. The notification may be based on one or more predetermined alert parameters.

In certain embodiments, the notification may be based on compliance of the driver and/or one or more passengers with one or more seatbelt regulations. In certain embodiments, non-compliance with one or more seatbelt regulations may be determined by detection of physical belt engagement. One or more notifications of non-compliance may be provided.

In an exemplary illustration, a texting-while-driving detection and isolation integrated notification system, method, and device may block detected localized radio frequency (RF) transmissions within a driver's proximity in a vehicle. The system may determine and identify target transmission patterns used for texting and may initiate one or more alert and notification actions. Alert and notification actions may include one or more visual light displays to other drivers and an electronic transmission alert to law enforcement vehicles, such as those within a localized range.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

FIG. 1 shows an exemplary system 100 for transmission detection, interruption, and notification according to one embodiment. In this exemplary implementation, system 100 may include one or more servers/computing devices 102 (e.g., server/computing device 1, server/computing device 2, . . . , server/computing device n) operatively coupled over network 104 to one or more receiving computing devices 106-1 to 106-n, which may include one or more receiving computing devices, one or more provider computing devices, one or more remote access devices, etc. The one or more servers/computing devices 102 may also be operatively connected, such as over a network, to one or more third party servers/databases 114 (e.g., database 1, database 2, . . . , database n). The one or more servers/computing devices 102 may also be operatively connected, such as over a network, to one or more system databases 116 (e.g., database 1, database 2, . . . , database n). Various devices may be connected to the system, including, but not limited to, receiving computing devices, client computing devices, consumer computing devices, provider computing devices, remote access devices, etc. This system may receive inputs 118 and outputs 120 from the various computing devices, servers and databases.

Server/computing device 102 may represent, for example, any one or more of a server, a general-purpose computing device such as a server, a detection system, either integral with or separate from a vehicle, a personal computer (PC), a laptop, a smart phone, a tablet, a wearable device, and/or so on. Networks 104 represent, for example, any combination of the Internet, local area network(s) such as an intranet, wide area network(s), cellular networks, WIFI networks, and/or so on. Receiving computing devices 106, which may include at least one processor, represent a set of arbitrary computing devices executing application(s) that respectively send data inputs to server/computing device 102 and/or receive data outputs from server/computing device 102. Such computing devices include, for example, one or more of desktop computers, laptops, mobile computing devices (e.g., tablets, smart phones, human wearable devices), server computers, and/or so on. In one implementation, the input data comprises, for example, transmission information and/or so on, for processing with server/computing device 102. In one implementation, the data outputs include, for example, notifications, emails, templates, forms, and/or so on. Embodiments of the present invention may also be used for collaborative systems with multiple users/systems performing various operations from various locations. Embodiments of the present invention may be web-based, smart phone-based and/or tablet-based or human wearable device based.

In this exemplary implementation, server/computing device 102 includes at least one processor coupled to a system memory. System memory may include computer program modules and program data.

Figure 2:
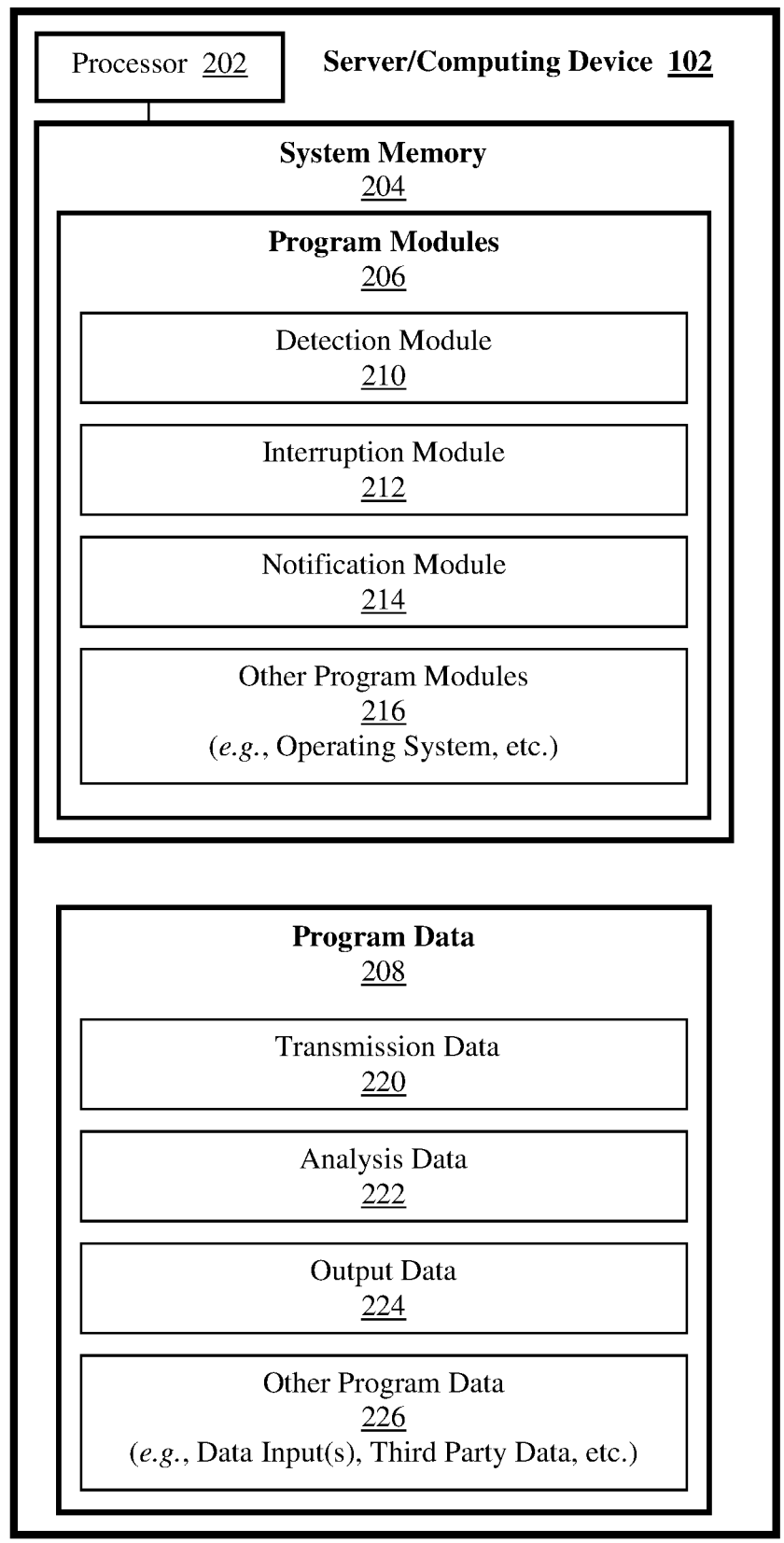
FIG. 2 shows an exemplary system for computational aspects of transmission detection, interruption, and notification.

In this exemplary implementation, server/computing device 102 includes at least one processor 202 coupled to a system memory 204, as shown in FIG. 2. System memory 204 may include computer program modules 206 and program data 208. In this implementation program modules 206 may include detection module 210, interruption module 212, notification module 214, and other program modules 216 such as an operating system, device drivers, etc. Each program module 210 through 216 may include a respective set of computer-program instructions executable by processor(s) 202. This is one example of a set of program modules and other numbers and arrangements of program modules are contemplated as a function of the particular arbitrary design and/or architecture of server/computing device 102 and/or system 100 (FIG. 1). Additionally, although shown on a single server/computing device 102, the operations associated with respective computer-program instructions in the program modules 206 could be distributed across multiple computing devices. Program data 208 may include transmission data 220, analysis data 222, output data 224, and other program data 226 such as data input(s), third party data, and/or others.

Figure 3:
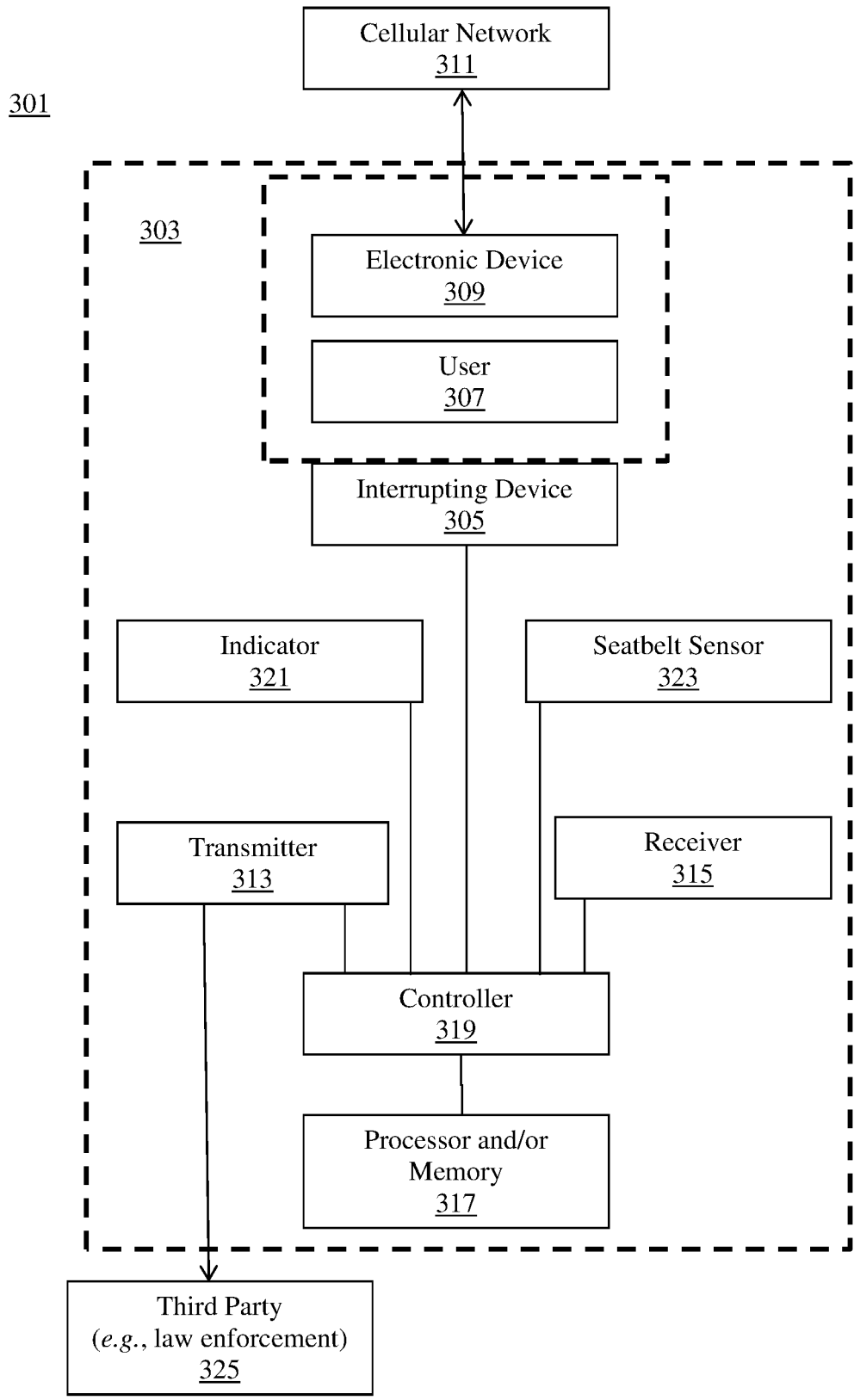
FIG. 3 shows an exemplary system overview for transmission detection, interruption, and notification.

FIG. 3 is an overview of an exemplary system. As shown in FIG. 3, a transmission detection, interruption, and notification system 301 may be employed in a location 303. The location 303 may be a vehicle, a portion of a vehicle, a non-mobile location, such as a room, a building, a portion of a room or building, etc.

The system 301 may interrupt one or more transmissions. To do so, the system 301 may interrupt one or more frequencies associated with the one or more transmissions. For purposes of this disclosure, the terms "interruption", "interrupt", etc. mean blocking at least a portion of the one or more frequencies associated with the one or more transmission. For purposes of this disclosure, the terms "interrupting", "jamming", "blocking", and "scrambling" may be used interchangeably. Interrupting may overpower a cellular device by transmitting a signal on the same frequency and at a high enough power that the interrupting signal and the transmitted signal collide and cancel each other out. Cellular devices may be designed to increase power if low-level interference is experienced. An interruption device may recognize and match a power increase from a cellular device in response to interference. An adaptive algorithm may be used to automatically adjust an interrupting signal to correspond to power increase from the cellular device. Interrupting a transmission may use distance of the cellular device from a detector. This may compensate for power increase by the cellular device.

Cellular devices may be full-duplex devices, which means cellular devices may use two separate frequencies. A first frequency may be for transmitting (e.g., talking), and a second frequency may be receiving (e.g., listening). The cellular device may use both separate frequencies simultaneously. In certain embodiments, an interrupting device may interrupt only one of the frequencies used by cellular devices, which may have the effect of interrupting both frequencies. The cellular device may determine that there is no service and/or insufficient service because it can receive only one of the frequencies.

Although different cellular systems process signals differently, all cellular networks use radio signals that can be interrupted. GSM, used in digital cellular and PCS-based systems, operates in the 900-MHz and 1800-MHz bands in Europe and Asia and in the 1900-MHz (sometimes referred to as 1.9-GHz) band in the United States. In certain embodiments, an interrupting device may broadcast on any frequency and is effective against Advanced Mobile Phone System (AMPS), Code Division Multiple Access (CDMA), Time Division Multiple Access (TDMA), Global System for Mobile Communications (GSM), Personal Communications Service (PCS), Digital Cellular System (DCS), Integrated Digital Enhanced Network (iDEN), NEXTEL, and other systems. Analog cellular devices as well as digital cellular devices may all be susceptible to interrupting.

Interrupting technology may be widely available. An antenna or the device may be the interrupting device.

In certain embodiments, the interruption may be localized to a predetermined location. The predetermined location may be a predetermined geographical location and/or a predetermined area of potentially mobile location, such as a predetermined area of a moving vehicle. In certain embodiments, the predetermined location may be a defined distance from a detection device. In certain embodiments, the predetermined location may be proximity to a driver within a vehicle. Proximity may be defined as within about 5 feet, about 4 feet, or about 3 feet of the exterior confines of a driver seat. In certain embodiments, proximity may be relative to a detection device. For example, proximity may be within about 5 feet, about 4 feet, or about 3 feet from a detection device, such as an antenna. In certain embodiments, proximity may be based on the location of an interruption device 305, such as an antenna. Proximity may be within approximately 5 feet of the interruption device, more preferably, within approximately 4 feet of the interruption device, and more preferably within approximately 3 feet of the interruption device.

A signal, such as radiation emitted from a cellular device and/or RF frequency, may change based on the cellular device and/or distance from a detection device. Strength of a signal may determine distance of the cellular device from a detection device. For a given cellular device, the strength of a signal can be used to calculate and/or look up distance from a signal. For example, for cellular device A, a signal strength of X may correlate to a distance of N meters between the cellular device and the detection device. Certain embodiments, may analyze strength of a signal to calculate distance to allow for interrupting the device. The interrupting signal may be modified based on the distance. If the distance to between the cellular device and detection device is known, then the strength of the interrupting signal may also be determined. Strength of the interrupting signal may be calculated and/or looked up based on distance. For example, if the distance between the cellular device A and the detection device is N meters, then the strength of the interrupting signal must be Y.

The system may analyze the emitted radiation and/or RF signal from the cellular device. The analysis may determine a presence and/or absence of interference in the emitted radiation and/or RF signal from the cellular device. Certain actions may interfere with the emitted radiation and/or RF signal from the cellular device. In certain embodiments, user entries may be interferences. User entries may be actions initiated by a user. User entries may include, but are not limited to, pressing a button and/or making a selection (such as pressing a touch sensitive screen on a smart phone and/or tablet). The user entries may create a pattern. For example, a pattern include an interference each time a user makes a selection, such as each time the user selects a letter, word, punctuation, etc. within a text message. If a user types the word "the" in a text message, the pattern may be three user entries with a time period, which would be the time it took the user to select the letters "t", "h", and "e". Patterns may include the number of user entries per time period. In certain embodiments, the patterns may only refer to user entries. In certain embodiments, the patterns may only refer to number of user entries.

The interference pattern may be analyzed to determine a category of activity. For example, a set of interferences lasting for approximately five seconds may indicate that a user is engaging in text messaging, emailing, or other unlawful and/or unauthorized activities. The categories of activities may be predetermined and patterns corresponding to each activity may be predetermined. Thresholds for parameters of the patterns may determine how the activity is categorized. For example, a set of interferences lasting for more than a predetermined amount of time may require notification. In certain embodiments, a set of interferences lasting more than about 3 seconds, about 4 seconds, about 5 seconds, about 6 seconds, about 7 seconds, about 8 seconds, about 9 seconds, about 10 seconds, about 15 seconds, about 20 seconds, etc. may require notification. In certain embodiments, a set of interferences with more than about 3 interferences per second, more than about 4 interferences per second, more than about 5 interferences per second may require notification. A set of interferences may be one or more interferes separated by less than a set duration of time. For example, a set of interferences may be one or more interferences separated in time by less than about 2 seconds, about 1.5 seconds, about 1.0 seconds, about 0.8 seconds, about 0.6 seconds, about 0.5 seconds, about 0.4 seconds, about 0.3 seconds, about 0.2 seconds, about 0.1 seconds, etc. For example, when a typical user types a text message or email, there are several user entries within a short period of time while the user composes the message. This pattern of user entries in turn creates a corresponding pattern of interferences in the emitted radiation and/or RF signal from the cellular device. As another example, a set of interferences of more than a certain amount may indicate a notification is required. In certain embodiments, if the set of interferences is more than about 10, about 11, about 12, about 13, about 14, about 15, about 20, about 25, about 30, etc. then a notification may be required. For example, a user may have ten user entries into a cellular device when typing a telephone number for a voice communication. If a user has more than 10 entries, that may suggest that the user is engaged in activities that may not be safe or lawful when driving a vehicle, such as texting or emailing. A set of 30 interferences, for example, may indicate that the user is composing an email. Patterns based on number of interferences in a set of interferences may also be correlated and/or analyzed over a set amount of time.

The patterns detected and utilized may not contain any information regarding the contents of the transmissions. In certain embodiments, the system does not detect the contents of the one or more transmissions, but is instead determining the pattern of user entries. In certain embodiments, no private information may be detected by the system.

In certain embodiments, the system may be operational at all times. In certain embodiments, the system may be operational when a vehicle is operational. In certain embodiments, the system may be operational only when a cellular device is operational within the vehicle and/or within proximity of the interruption device 305. In certain embodiments, the system may be operation when a vehicle is in motion. The system may sense when the vehicle is moving and/or may receive information from the vehicle to determine if the vehicle is in motion. In certain embodiments, the system may utilize a global positioning system and/or a momentum monitoring device to determine if the vehicle is in motion.

Certain embodiments may include programmable options. In one option, interfering may occur for a cellular device in proximity to a vehicle driver. In another option, frequency interference patterns may determine if a notification is required and activate an alert system. In another embodiment, frequency interference patterns may determine if a notification is required and interrupt the one or more transmissions after a predetermined time. The predetermined time may be about 5 seconds, about 6 seconds, about 7 seconds, about 8 seconds, about 9 seconds, about 10 seconds, about 12 seconds, about 15 seconds, about 20 seconds, etc.

In certain embodiments, the customer/user may not be able to program the system. The device options may only be set by the installer/manufacturer. The options may be determined by one or more requirements of a regulating agency, such as law enforcement, insurance companies, government agencies, commercial vehicle owners, etc.

Referring again to FIG. 1, in certain embodiments, a user 307, such as a driver, may be using one or more cellular devices 309 that are in communication with one or more cellular networks 311. In certain embodiments, the one or more cellular devices 309 may operate as full duplex enabled devices using separate frequencies for transmission 313 (talking) and receiving 315 (listening) simultaneously as is well-known and understood by those skilled in the art. Certain embodiments may block one, multiple or all frequencies used by cellular devices. This may have the effect of interrupting all communication with the cellular devices. In certain embodiments, a cellular device may be placed into a "no service" status, and may not function in close proximity to an interrupting device. In certain embodiments, all transmission frequencies may be blocked at once. In certain embodiments, specific frequencies may be turned on/off as desired.

Cellular systems may use the Global System for Mobile Communications (GSM) and Personal Communications Service (PCS) based systems. These cellular systems may operate in the 900-MHz and 1800-MHz bands in Europe and Asia and in the 1900 MHz, referred to as 1.9 GHz, band in the United States. Although different cellular systems process signals differently, all cellular telephone networks utilize radio signals that can be interrupted. Certain embodiments may broadcast on any frequency for transmission by the cellular devices. In certain embodiments, selected subsets of frequencies may be selected. Certain embodiments may be useful for analog as well as digital devices. Certain embodiments may be effective against transmissions selected from, but not limited to, Advanced Mobile Phone System (AMPS), Code Division Multiple Access (CDMA), Time Division Multiple Access (TDMA), Global System for Mobile Communications (GSM), Personal Communications Service (PCS), Digital Cellular System (DCS), Integrated Digital Enhanced Network (iDEN), NEXTEL, and other systems.

As examples, the following are exemplary U.S. cellular network carriers and operative ranges.

AT&T uses both the 800 and 1900 MHz bands for voice services depending upon the area, but the majority of their customers communicate on the 800 MHz band. AT&T's Evolution-Data Optimized (EVDO) network utilizes the 1900 MHz band.

VERIZON WIRELESS uses both the 800 and 1900 MHz bands for voice services depending upon the area, but the majority of their customers communicate on the 800 MHz band. VERIZON WIRELESS's EVDO network utilizes the 1900 MHz band.

T-MOBILE uses the 1900 MHz band for both voice and data service.

SPRINT uses the 1900 MHz band for both voice and data service. SPRINT has many active roaming contracts, in which case voice may sometimes be carried on the 800 MHz band.

NEXTEL uses proprietary iDEN multi-frequency technology.

ALLTEL uses both the 800 and 1900 MHz bands for voice services depending upon the area, but the majority of their customers communicate on the 800 MHz band. ALLTEL's EVDO network utilizes the 1900 MHz band.

US CELLULAR uses both the 800 and 1900 MHz bands for voice services depending upon the area, but the majority of their customers communicate on the 800 MHz band. US CELLULAR's data network utilizes the 1900 MHz band.

In certain embodiments, an interruption device 305 may include an operative detection and transmission antenna. The antenna may be positioned within the location 303, such as within a vehicle. In a vehicle, the antenna may be positioned at or near the vehicle's windshield. Positioning at or near the vehicle's windshield may allow for more effective proximity detection and interruption of the frequencies emanating from the driver's position. In certain embodiments a single antenna may be used for detection and interrupting. In other embodiments, separate antennas may be used for detection and interruption. In certain embodiments, the strongest frequency detection and/or interrupting may be within a predetermined distance from the antenna. In certain embodiments, the interruption device 305 may be a directional antenna. The interruption device 305 may detect a frequency used for communications. After the frequency has been detected, the frequency may be monitored for interference patterns. If a certain pattern has been detected, the system may analyze the certain pattern and determine a category of activity. If the category of activity requires notification and/or interrupting, the system may carry out the prescribed action.

In certain embodiments, Bluetooth frequencies (2.402 GHz-2.480 GHz) may not be affected by the interrupting device 305. In vehicles equipped with Bluetooth systems, which may allow a driver to perform hands-free voice communication, continued use of Bluetooth frequencies may be possible. Therefore, Bluetooth oriented voice frequency transmissions may be unaffected by certain embodiments.

Certain embodiments may provide the ability to analyze and determine one or more characteristics of one or more transmissions. For example, certain embodiments may be able to analyze the one or more transmission and determine a categorization for the one or more transmission, such as if the one or more transmission is a text message. Selective disruption of the one or more transmissions may be provided to a predetermined location around a user of the cellular device.

The transmission frequency detection determination for a specific type of user transmission, such as texting, may be enabled by the use of software. Software may reside in a processor and/or memory 317 of one or more controllers 319.

Transmission detection may include several specific processes and determinations. For example, the transmission detection may determine various parameters.

1. Proximity signal strength detection. This may be modified for cellular device frequency. The signal strength detection may include measurement of emanating radiation. The proximity signal strength detection may be modified to adapt to cellular telephone technology and corresponding frequencies.

2. Separation and isolation of defined Bluetooth frequency. In certain embodiments, Bluetooth frequencies may not be affected by interrupting by the system. In certain embodiments, Bluetooth frequencies may not be monitored by the system.

3. Containing an Analyzing Software Application. As noted herein, the analyzing software application may determine and analyze patterns in emitted radiation and/or RF signals.

4. Receiving analyzed information and displaying. Results of the analyzing may be stored and/or transferred to a separate location, such as a database. Information from any stage may be displayed for the user and/or third parties.

5. Emitting analyzed signal to low voltage visual reference. In certain embodiments, the system may send instructions to activate a visual reference and/or may directly activate a visual reference.

6. Interrupting transmission activity at a predetermined location. In certain embodiments, the system may send instructions to interrupt one or more transmissions and/or may directly interrupt the one or more transmissions.

7. A signal detector may detect a frequency of an electronic device in use. The signal detector may submit the frequency information to signal analyzing and detection software. The signal analyzing and detection software may provide signal pattern recognition.

The signal analyzing and detection software may determine one or more patterns in the one or more transmissions. For example, text messaging or any texting process may have a specific pattern. The pattern may take the form of breaks in the radiation emitted by a cellular device and/or RF signal. The software may analyze the pattern and determine a type of transmission without reading any actual information within the one or more transmissions. By detecting and analyzing the radiation pattern, and not the actual information (data) transmitted, the system may not violate data privacy.

All cellular telephone activity creates frequency waves. Those waves can be analyzed and compared with specific types of transmissions, such as text messages, voice calls, etc. The system may analyze those patterns, determine the frequency, and compare wave forms. Certain functions may include the following:

1. Analyzing the frequency pattern and wave forms, including radiation, for proximity.

2. Submitting the pattern on a specified frequency. As an example, the specified frequency may be a law enforcement frequency.

3. Trigger a visual indicator, such as a low voltage light. The visual indicator may be mounted outside of the vehicle. The low voltage light may be visible to third parties outside the vehicle, including law enforcement and/or other drivers.

4. Store the information and frequency detected.

In certain embodiments, the system may provide for a multiple detection frequency of GSM and CDMA 824-849 MHz, UTM 1920-1980 and PCS 1720-1850, and 1010 MHz uplink with the exception of Bluetooth in the 2.4 GHz frequency.

An analyzing system may provide for information and display on select law enforcement monitors. The analyzing system may emit an analyzed signal to low voltage reference.

An identification system may identify a target transmission and therefore may determine the nature of the transmission. This analytical determination of what kind of transmission is taking place may have a high degree of accuracy assuring that the target transmission criteria has been met. The identification system may then initiate one or more interdiction transmission protocols and one or more alert notification actions.

A system receiver 315 and transmitter 313 may be required to initially detect and receive the user's 307 transmissions. The receiver 315 and/or transmitter 313 may be required to disrupt the user's 307 transmissions in proximity to the user 307. Once such driver target transmissions are detected, notification and alert action sequences may be activated, including an indicator 321, such as a visual indication to other drivers. In certain embodiments, the indicator 321 may be, for example, a dedicated independent external light. In certain embodiments, the indicator 321 may be the vehicle's existing lights activated in a predetermined sequence.

A wireless alert and notification action may transmit an alert signal to one or more third parties, such as law enforcement. In certain embodiments, the alert signal may be a low-powered transmission. The alert signal may be directed by frequency determination to local law enforcement emergency vehicles. In certain embodiments, the local law enforcement emergency vehicles may be located within a defined proximity to the transmitting vehicle, based on transmission effective power and therefore range.

Such informational emergency service alert transmissions may therefore be configured once received through a variety of alert notification protocols dependent on institutional receiver requirements.

Figure 4:
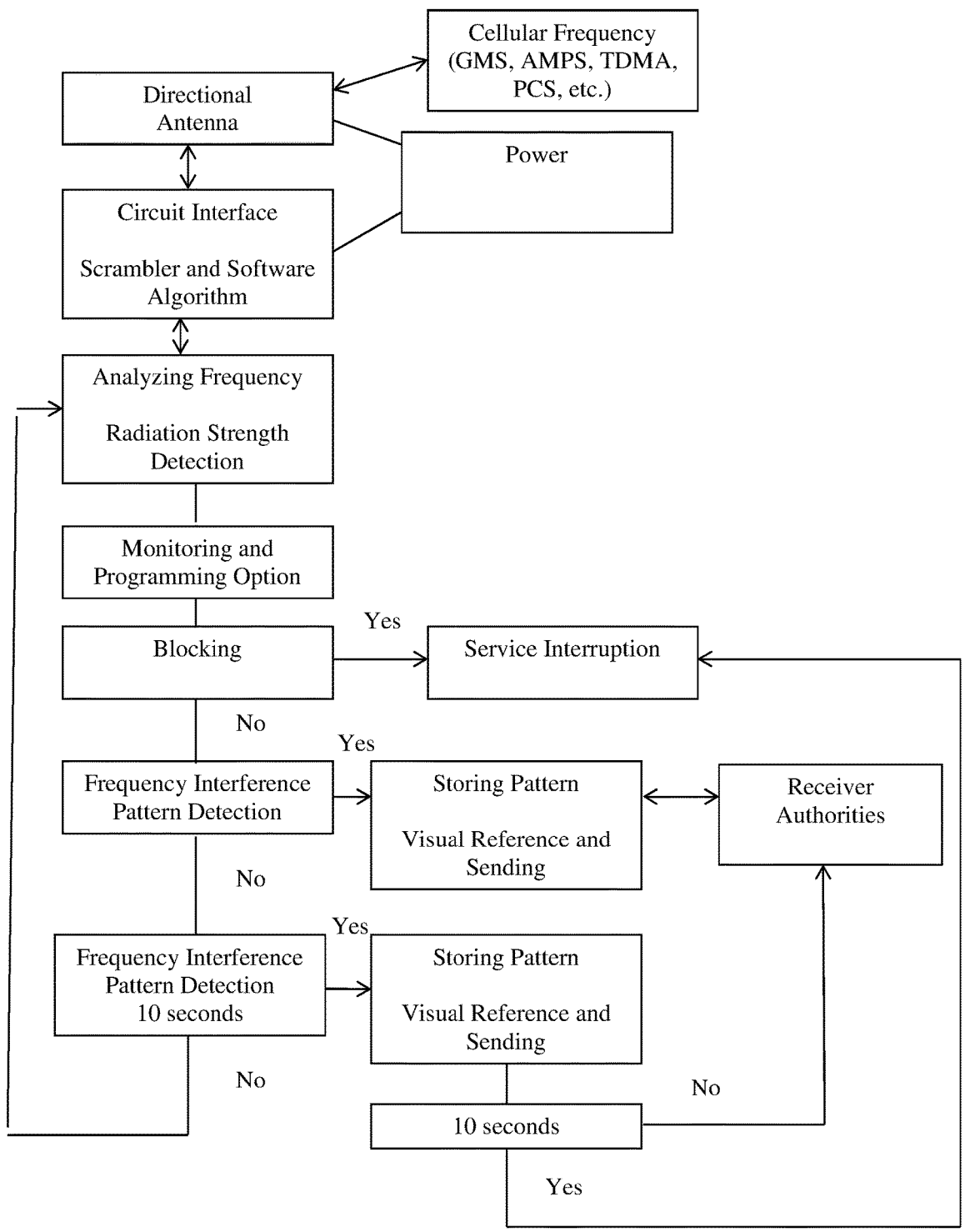
FIG. 4 shows an exemplary flow diagram for transmission detection, interruption, and notification.

FIG. 4 is an overview of an exemplary system according to an embodiment of the invention.

A cellular frequency may be received by a cellular device. A directional antenna may receive the cellular frequency. The directional antenna may be powered. The directional antenna may detect a mobile device frequency, a signal strength, and an interference pattern in the vicinity of the directional antenna. The directional antenna may interface with a circuit interface containing a scrambler and software algorithm. The circuit interface may also be powered. The circuit interface and software algorithm may analyze the cellular frequency and perform a radiation strength detection. The system may perform monitoring and programming option. A determination may be made as to whether blocking is required. If yes, then cellular service may be interrupted. If no, the frequency and interference pattern may be detected. If yes, then the pattern may be stored and a visual reference may be sent. Authorities may receive the communication. If the frequency interface pattern is detected for a threshold, such as 10 seconds, the pattern may be stored and a visual reference may be sent. If it is not for a threshold, such as 10 seconds, Authorities may receive the communication. Otherwise, the service may be interrupted. If the frequency pattern interference pattern is not detected for a threshold, such as 10 seconds, the process cycles back to analyzing the frequency and radiation strength detection.

Frequency monitoring may occur continuously between cellular device, antenna and circuit board.

Voice communications do not emit an interference pattern and may not be recognized as texting or emailing.

The Circuit Device may continuously monitor RF Frequencies and may look for frequency interference patterns. If the system is programmed for scrambling/blocking only frequency interference patterns may be automatically ignored.

If an interference pattern has been detected, the information (or wave outputs with pattern characteristics) may be automatically stored and analyzed. The pattern (texting) may be sent to a RF capable receiving device. The receiving device may show with up to or exceeding 99% accuracy that the transmitted pattern emanated from a cellular device where the driver was texting while driving.

The algorithm may allow various programing methods.

1. Blocking/Scrambling.
2. Frequency interference pattern recognition with data storage and data wave transmission.
3. Frequency interference pattern recognition with data storage and data wave transmission and blocking/scrambling after a certain amount of seconds (programmable).

In certain embodiments, the system may communicate/transmit on a reserved frequency to alert authorities equipped with a RF receiver. The RF receiver may receive only the already analyzed conclusions regarding activity categorization and monitored frequency interference patterns emanating from the circuit board inside the vehicle. At the same time the system may trigger a visual light installed the vehicle to show authorities the driver is engaged in an illegal activity, such as texting while driving.

In certain embodiments, the frequency pattern interference can be defined as "out of phase" as they arrive distorted at a certain interval. The distortion in the emanating waves may be monitored by using or connecting an oscillograph or other devices or methods for detecting emitted radiation and/or RF frequency. In certain embodiments, the monitoring may be via visual monitoring. Distances between peaks, valleys, or other variations may be measured automatically to determine a pattern. The distance may be measured with known RF radiation field strength methods.

Certain embodiments may also be useful for other non-compliance criteria. For example, seatbelt use may be monitored. Certain embodiments may detect failure of one or more vehicle occupants to wear a seatbelt. One or more seatbelt sensors 323, such as occupancy sensors similar to those in use in passenger airbag systems currently available in the automotive industry may be used. Upon detection of non-compliance with criteria, the system may initiate an alert and/or notification. In certain embodiments, a visual indication may alert law enforcement of the non-compliance.

In certain embodiments, the system and methods may be integrated into a vehicle's existing computer system. Other operational features can be initiated within the system, including for example vehicle location using integrated GPS. In certain embodiments, the system and methods may be a standalone system that may or may not interact with the vehicles existing computer system.

In certain embodiments, a hardware system may be provided. Hardware components may include, but are not limited to, an antenna, a processor, a controller, a memory, an transmitter, a receiver, an indicator, etc.

In certain embodiments, a tracking device may be provided. The tracking device may be of various sizes. For example, one or more dimensions of a device may range from about 0.25 inches to about 10 inches, or about 0.5 to about 8 inches, or about 1 to about 5 inches. One or more interrupting devices may be an antenna. The antenna may be any type of antenna, but may preferably be a flexible antenna. The flexible antenna may be about 2 to about 10 feet, preferably about 3 to about 8 feet, more preferably about 4 to about 5 feet. The antenna may be mounted inside the windshield. The antenna may be mounted around the windshield. The antenna may be mounted around the windshield of the driver's side of a vehicle.

A tracking device may have various functions.

Interruption

The interruption function may be used to interrupt one or more transmissions. In certain embodiments, one or more radio frequency transmissions may be scrambled within proximity of the driver. In certain embodiments, no driver may be able to use the phone while in motion and while sitting in the driver's seat. In certain embodiments, front and rear passenger may not be affected by the interruption.

Frequency Detection

The frequency detection function may be used for detection and isolation of a transmission. The frequency detection function may allow operation of the device on certain frequencies (i.e., Bluetooth at 2.402 GHz-2.480 GHz).

All cellular telephone activity emits a certain frequency pattern (radiation) for talk, texting or browsing the web.

Certain embodiments may identify a frequency pattern of the one or more transmissions.

Certain embodiments may then determine the category of the one or more transmissions.

If a certain frequency pattern has been detected, the system may then determine what kind of transmission is taking place. In certain embodiments, the system may be able to tell with an over 90% accuracy what kind of transmission has been submitted.

In certain embodiments, the system may integrate with a global positioning system (GPS) on the electronic device. The GPS system may provide a location and movement of the electronic device.

In certain embodiments, the system can be made temper safe and/or tamper resistant by integrating the system into a vehicle onboard computer system.

Emergency Vehicle Detection and Notification

Certain embodiments may also include systems for detection and/or notification of oncoming emergency vehicles. Emergency vehicles may be equipped with low frequency emitting module. The emitting module may be activated manually or automatically. For example, the emitting module may be activated by a driver or occupant of the emergency vehicle when responding to an emergency. In certain embodiments, the emitting module may be automatically activated upon initiation of a siren. In certain embodiments, a centralized server and/or system may initiate a device on a remote emergency vehicle.

A signal may be sent to a device on a third party vehicle. In certain embodiments, the signal may be sent over a reserved and/or predetermined frequency. The third party vehicle may then notify the driver and/or passengers of the third party vehicle of an emergency vehicle nearby. The signal may activate a warning light, sound, or other notification system. In certain embodiments, the signal may activate a dashboard integrated warning light.

In certain embodiments, all emergency vehicles in a predetermined proximity that are responding to an emergency may cause activation of a notification in the third party vehicle. In certain embodiments, only emergency vehicles approaching the third party vehicle may activate the notification.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A computerized method of transmission detection, interruption, and notification, the computerized method comprising the steps of:
receiving emitted radiation or a radio frequency (RF) signal from a cellular device at a detector, wherein the emitted radiation or the RF signal correspond to a cellular transmission from the cellular device;
determining a distance of the cellular device from the detector using the emitted radiation or the RF signal;
isolating and targeting a frequency of the RF of the cellular transmission, allowing for a user to perform hands-free voice communication using a bluetooth frequency;
determining a pattern of a set of interferences in the emitted radiation or the RF signal, wherein each interference in the set of interferences is created by the user entry into the cellular device;
correlating the pattern with a category of activity to determine a type of cellular transmission; and
interrupting transmission of the cellular transmission using the distance,
wherein the receiving emitted radiation or a radio frequency (RF) signal, determining a distance, isolating and targeting a frequency, determining a pattern, correlating the pattern, and interrupting the transmission are performed using at least one processor coupled to a memory.

2. The method of claim 1, wherein the detector is an antenna.

3. The method of claim 1, wherein the cellular transmission is a text message.

4. The method of claim 1, wherein determining a distance is based on the strength of the emitted radiation or the RF signal.

5. The method of claim 1, wherein determining the distance is based on characteristics of the cellular device.

6. The method of claim 1, wherein the use entry is pressing a button or making a selection on a touch screen.

7. The method of claim 1, wherein the determining a pattern of a set of interferences comprises detecting one or more interferences, wherein the one or more interferences is a distortion in the emitted radiation or the RF signal.

8. The method of claim 1, wherein the pattern is a number of interferences.

9. The method of claim 8, wherein the pattern is a number of interferences in a predetermined amount of time.

10. The method of claim 1, wherein the correlating comprises comparing the pattern against patterns for specific types of cellular transmissions.

11. The method of claim 1, wherein the type of cellular transmission is a text message.

12. The method of claim 1, further comprising notifying a third party of the cellular transmission.

13. The method of claim 12, wherein the third party is a law enforcement agency.

14. The method of claim 12, wherein the third party is an individual not within proximity of the detector.

15. The method of claim 12, wherein the notifying is by a visual indicator.

16. The method of claim 12, wherein the visual indicator is on the exterior of a vehicle.

17. The method of claim 1, wherein the detector and cellular device are within a vehicle.

18. A computerized method of transmission detection, interruption, and notification, the computerized method comprising the steps of:
   receiving emitted radiation or a radio frequency (RF) signal from a cellular device at a detector;
   isolating and targeting a frequency of the RF of the cellular transmission with an identification system that is located within a vehicle, allowing for a user to perform hands-free voice communication using a bluetooth frequency;
   determining a pattern of a set of interferences in the analyzing a pattern of the emitted radiation or the RF signal, wherein each interference is created by a user entry into the cellular device;
   correlating the pattern with a category of activity to determine a type of cellular transmission; and
   notifying a third party of the type of cellular transmission, wherein the receiving emitted radiation or a radio frequency (RF) signal, isolating and targeting a frequency, determining a pattern, correlating the pattern, and notifying a third party are performed using at least one processor coupled to a memory.

19. The method of claim 18, further comprising interrupting the cellular transmission.

20. The method of claim 18, wherein detector and the cellular device are within a moving vehicle and the type of cellular transmission is a text message.

* * * * *